United States Patent [19]
Yamakawa et al.

[11] Patent Number: 5,655,878
[45] Date of Patent: Aug. 12, 1997

[54] HIGHER HARMONIC CONTROL APPARATUS FOR A HELICOPTER ROTOR

[75] Inventors: Eiichi Yamakawa; Atsushi Murashige; Noboru Kobiki, all of Kakamigahara, Japan

[73] Assignee: Advanced Technology Institute of Commuter-Helicopter, Ltd., Gifu, Japan

[21] Appl. No.: 604,343

[22] Filed: Feb. 21, 1996

[30] Foreign Application Priority Data

Feb. 28, 1995 [JP] Japan ........................... 7-040745

[51] Int. Cl.$^6$ .................. B64C 11/40; B64C 27/64
[52] U.S. Cl. .................. 416/31; 416/61; 416/114; 416/500; 92/26; 92/27
[58] Field of Search ........................ 416/31, 43, 61, 416/114, 500; 92/26, 27, 28

[56] References Cited

U.S. PATENT DOCUMENTS

| | | | |
|---|---|---|---|
| 3,744,928 | 7/1973 | Hansen et al. | 416/31 |
| 3,960,348 | 6/1976 | Fowler et al. | 416/31 |

FOREIGN PATENT DOCUMENTS

| | | |
|---|---|---|
| 601794 | 6/1994 | European Pat. Off. |
| 308204 | 12/1988 | Japan . |
| 83906 | 3/1989 | Japan . |
| 113101 | 4/1990 | Japan . |
| 2149473 | 12/1985 | United Kingdom . |

OTHER PUBLICATIONS

Letter from European Associate and Copy of European Search Report dated Jun. 21, 1996.
Lehman, G. and Kube, R. Automatic Vibration Reduction at a Four Bladed Hingeless Model Rotor—A Wind Tunnel Demonstration, Vertica, vol. 14, No. 1 (1990), pp. 69–86.
Achache, M. and Polychroniadis, M. Development of an Experimental System for Active Control of Vibrations on Helicopters—Development Methodology for an Airborne System, Vertica, vol. 11, No. 1/2 (1987), pp. 123–136.

*Primary Examiner*—Christopher Verdier
*Attorney, Agent, or Firm*—Baker & Botts, L.L.P.

[57] ABSTRACT

A control system has an HHC actuator having a basal portion and a movable portion. A load acting on the control system is detected by a semiconductor gauge. The load detected by the semiconductor gauge is compared with a threshold value in a computer. If the detected load is larger than the threshold load, the movable portion is fixed to the basal portion by a fixing mechanism. By detecting the sign of stall of blades, the HHC actuator is fixed in a neutral position, allowing safe flight. A fixing switch is provided for allowing the fixing mechanism to operate regardless of the result of the comparison with the computer.

5 Claims, 6 Drawing Sheets

HIGHER HARMONIC CONTROL APPARATUS FOR A HELICOPTER ROTOR

BACKGROUND OF THE INVENTION

1. Field of the Invention

The present invention relates to a higher harmonic control apparatus for a helicopter rotor, for controlling the helicopter rotor so as to suppress the rotor vibration by changing a pitch angle of the helicopter rotor at a frequency which is an integer multiple of a rotor rotating frequency, to reduce noises which are generated by the rotation of the helicopter rotor.

2. Description of the Related Art

Figure 7A:
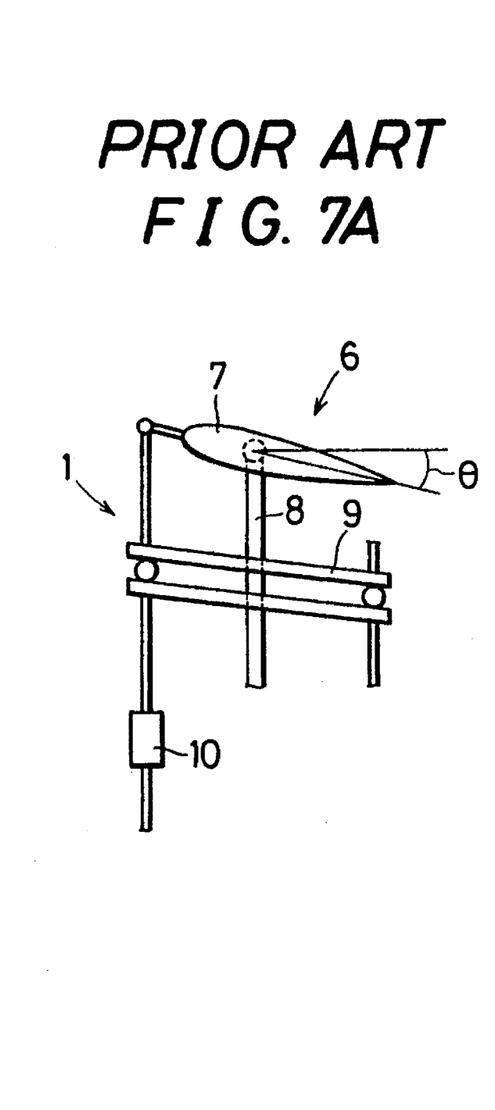
FIG. 7A is a schematic view showing a control system 1 which is not provided with a higher harmonic control apparatus.
Figure 7B:
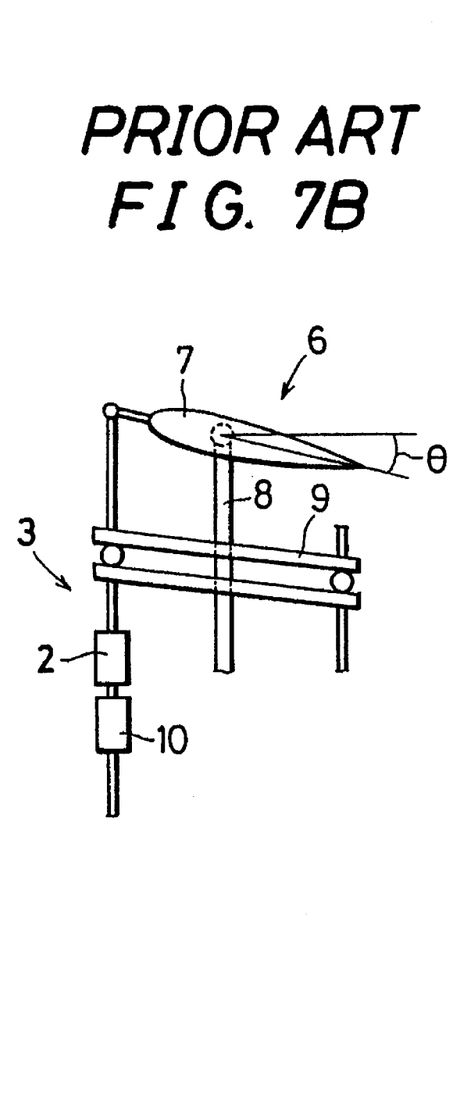
FIG. 7B is a schematic diagram showing a control system 3 which is provided with an HHC actuator 2 as a higher harmonic control apparatus.
Figure 7C:
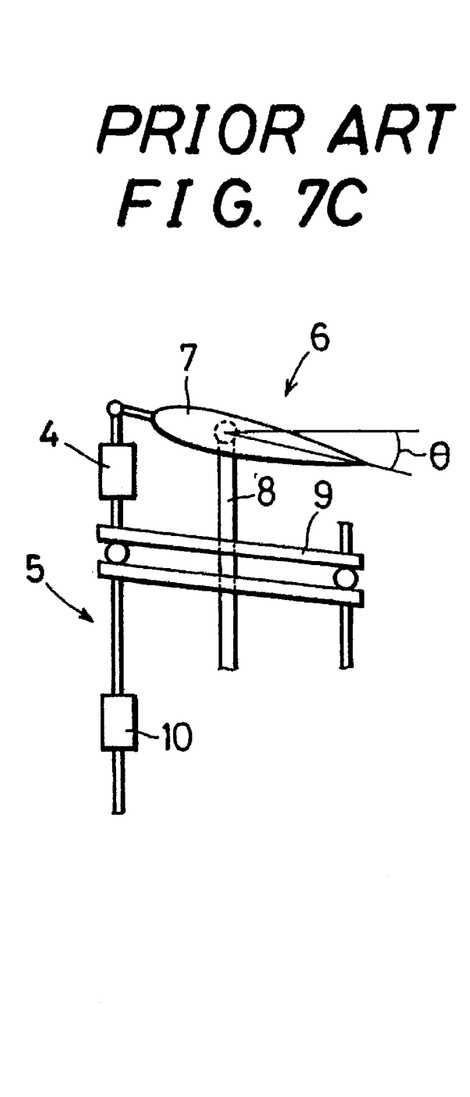
FIG. 7C is a schematic diagram showing a control system 5 which is provided with an IBC actuator 4 as a higher harmonic control apparatus.

FIG. 7 shows a part of a prior art control system for a helicopter. FIG. 7A is a schematic view showing a control system 1 which is not provided with a higher harmonic control apparatus, FIG. 7B is a schematic view showing a control system 3 which is provided with an HHC actuator 2 as a higher harmonic control apparatus, and FIG. 7C is a schematic view showing a control system 5 which is provided with an IBC actuator 4 as a higher harmonic control apparatus. The HHC actuator 2 is an actuator having a higher harmonic control system. Hereinafter, such an actuator is abbreviated as an HHC actuator. The IBC actuator 4 is an actuator having an individual blade control (IBC) system. Hereinafter, such an actuator is abbreviated as an IBC actuator.

Referring to FIG. 7A, a helicopter rotor (hereinafter simply referred to as a rotor) 6 is caused to rotate by the torque transmitted through a rotor shaft 8 from a motor (not shown). The rotor 6 comprises a plurality of blades 7 (for simple illustration, only one blade is shown in FIG. 7). The pitch angle θ of the blade 7 is controlled by a control actuator 10 via swash plates 9. As a result, the lift caused at the time when the rotor 6 is rotated is controlled, and the helicopter is maneuvered.

When the rotor 6 is rotated, an external force due a air enveloping the blade 7 acts on the blade 7. The external force is periodically varied in one revolution of the rotor 6, so that the external force serves as an excitation force which vibrates the fuselage of the helicopter (not shown). The generated vibration may adversely affect gauges, cause difficulty in reading gauges, make passengers feel uneasy, and cause fatigue of the fuselage architecture. These adverse effects may become sources of various problems.

In order to prevent vibration of the fuselage which may cause such problems, a tendency to mount a higher harmonic control apparatus in a helicopter rotor is recently seen. Among higher harmonic control apparatuses, apparatuses which actively perform the vibration control include the HHC actuator 2 shown in FIG. 7B, and the IBC actuator 4 shown in FIG. 7C. Each of the actuators is a higher harmonic control actuator for changing the pitch angle θ of the blade 7 at a frequency which is an integer multiple of a rotation frequency of the rotor 6, i.e., at a higher harmonic, and for controlling the external force acting on the blade 7, thereby reducing the vibration of the fuselage.

The HHC actuator 2 is disposed below the swash plates 9, and collectively controls the pitch angles θ of the blades 7 via the swash plates 9. The IBC actuator 4 is disposed above the swash plates 9, and individually controls the pitch angles θ of the blades 7.

Other examples of prior art are described in, for example, Japanese Unexamined Patent Publications JPA 63-308204 (1988), 64-83906 (1989), and 2-113101(1990).

In such prior art examples, the higher harmonic control is actively performed by using a high-response HHC actuator 2 or a high-response IBC actuator 4. It is assumed that the actuator 2 or 4 is designed under the same load conditions as those for the control actuator 10. If the pressurizing areas of the actuators are equal to each other, the amounts of oil are proportional to the operating frequency of the actuators. The HHC actuator 2 or the IBC actuator 4 operates at a higher harmonic (a higher frequency). For these reasons, the amount of hydraulic fluid required for the actuator 2 or 4 to operate is several times as large as that required for the control actuator 10 to operate. As a result, the hydraulic supply has an increased size, and occupies a larger area, and moreover the weight of the fuselage is significantly increased.

The stall of the blades 7 of the rotor 6 which occurs in the flight can be recognized by a pilot because of the increase in vibration of the fuselage. In the case where the HHC actuator 2 or the IBC actuator 4 is mounted on the helicopter, however, there is a drawback fear that the actuator 2 or 4 may damp the vibration caused by the stall. In such a case, it may take a long time for the pilot to recognize the stall of the blades 7.

SUMMARY OF THE INVENTION

Hence, an object of the invention is to provide a higher harmonic control apparatus for a helicopter rotor which is provided with a higher harmonic control actuator requiring a small amount of hydraulic fluid and a small hydraulic supply, and which does not damp the vibration of the fuselage in a condition where the stall of blades occurs.

The invention provides a higher harmonic control apparatus for a helicopter rotor comprising:

a higher harmonic control actuator having a basal portion and a portion movable with respect to the basal portion;

a control system for operating a pitch angle change of the helicopter rotor;

means for detecting a load acting on the control system;

means for comparing the load detected by the load detecting means with a predetermined threshold of load; and fixing means, responsive to the output of the comparing means, for fixing the movable portion to the basal portion when the detected load is larger than the threshold load.

The higher harmonic control apparatus of the invention preferably further comprises means for generating commands to activate the fixing means regardless of the output of the comparing means.

Further the higher harmonic apparatus of the invention is preferably constituted such that an engagement hole is formed in the movable portion of the higher harmonic control actuator and the fixing means has a movable pin which can be inserted into the engagement hole when the movable portion is put in a neutral position.

Further the higher harmonic apparatus of the invention preferably further comprises display means for displaying the detected load.

Further the harmonic apparatus of the invention is preferably constituted such that a low-pass filter having a predetermined cut-off frequency is provided between the detecting means and the comparing means.

According to the invention, the control system of the helicopter comprises a higher harmonic control actuator having a basal portion and a movable portion which is movable with respect to the basal portion, so that the pitch angle of the helicopter rotor is operated, and the external force acting on the blades of the helicopter rotor is controlled, whereby the fuselage is prevented from vibrating. The higher harmonic control can effectively be utilized for reducing noises of the helicopter rotor. Accordingly, by using a computer and appropriately selecting a control software, a harmonic control actuator can be applied so as to reduce noises of the helicopter. The load acting on the control system is detected by the load detecting means, and the detected load is compared with a predetermined threshold load by the comparing means. When the detected load is larger than the threshold load, the movable portion of the harmonic control actuator is fixed to the basal portion by the fixing means.

With the above-described construction, the threshold load may be set to a load appearing just below the start of stall of the blades. When the stall of blades occurs, the movable portion of the higher harmonic control actuator is fixed to the basal portion, so as not to allow the higher harmonic control actuator to damp the vibration. Accordingly, the pilot can recognize the stall of the blades at an early stage, and the danger can be avoided.

When the threshold load is set to be small, the load conditions in the design of the higher harmonic control actuator can be set small. Accordingly, the amount of operating fluid required for the higher harmonic control actuator to operate is largely reduced, and the increase in size of the hydraulic reservoir can be prevented.

According to the invention, regardless of the comparison results of the comparing means, the operation of the fixing means, i.e., the fixing of the movable portion of the higher harmonic control actuator to the basal portion can be instructed by the command means. As a result, the pilot can stop the damping operation of the higher harmonic control actuator at any desired time, and recognize the vibration conditions. Accordingly, the pilot can recognize the danger which may be caused by the stall of blades at an earlier stage and avoid the danger with certainty.

Further, according to the invention, an engagement hole is formed in the movable portion of the higher harmonic control actuator, and the fixing means has a movable pin which can be inserted into the engagement hole when the movable portion is put in a neutral position. As a result, in a condition where the movable portion is disposed in the neutral position, the movable portion can be fixed to the basal portion. Accordingly, the fixing means is prevented from operating in a condition where the pitch angles of the blades are changed by the higher harmonic control actuator, and hence the pilot can readily maneuver the helicopter.

Still further, according to the invention, the display means for displaying the detected load is provided, so that the detected load can be displayed, for example, in real time. As a result, even after the vibration has been damped by the higher harmonic control actuator, the pilot can easily foresee possible dangerous conditions such as the stall of blades based on the detected load. Consequently, the pilot can recognize the danger at an earlier stage without causing the passenger to feel a sense of unease, and it is possible to prevent the difficulty in reading of the gauges and the occurrence of fatigue of the fuselage due to the vibration of the fuselage.

Yet further, according to the invention, the low-pass filter having a cut-off frequency is provided between the detecting means and the comparing means. As a result, for example, among detected load signals, a load value signal oscillating at a frequency which is lower than the double of a product of the rotation frequency of the helicopter rotor and the number of blades can be supplied to the comparing means. Accordingly, noise components can be removed, and the pilot can accurately cope with the stall of blades.

BRIEF DESCRIPTION OF THE DRAWINGS

Other and further objects, features, and advantages of the invention will be more explicit from the following detailed description taken with reference to the drawings wherein:

FIGS. 7A–7C are views showing parts of a prior art control system for a helicopter, of which

DETAILED DESCRIPTION OF THE PREFERRED EMBODIMENTS

Now referring to the drawings, preferred embodiments of the invention are described below.

Figure 1:
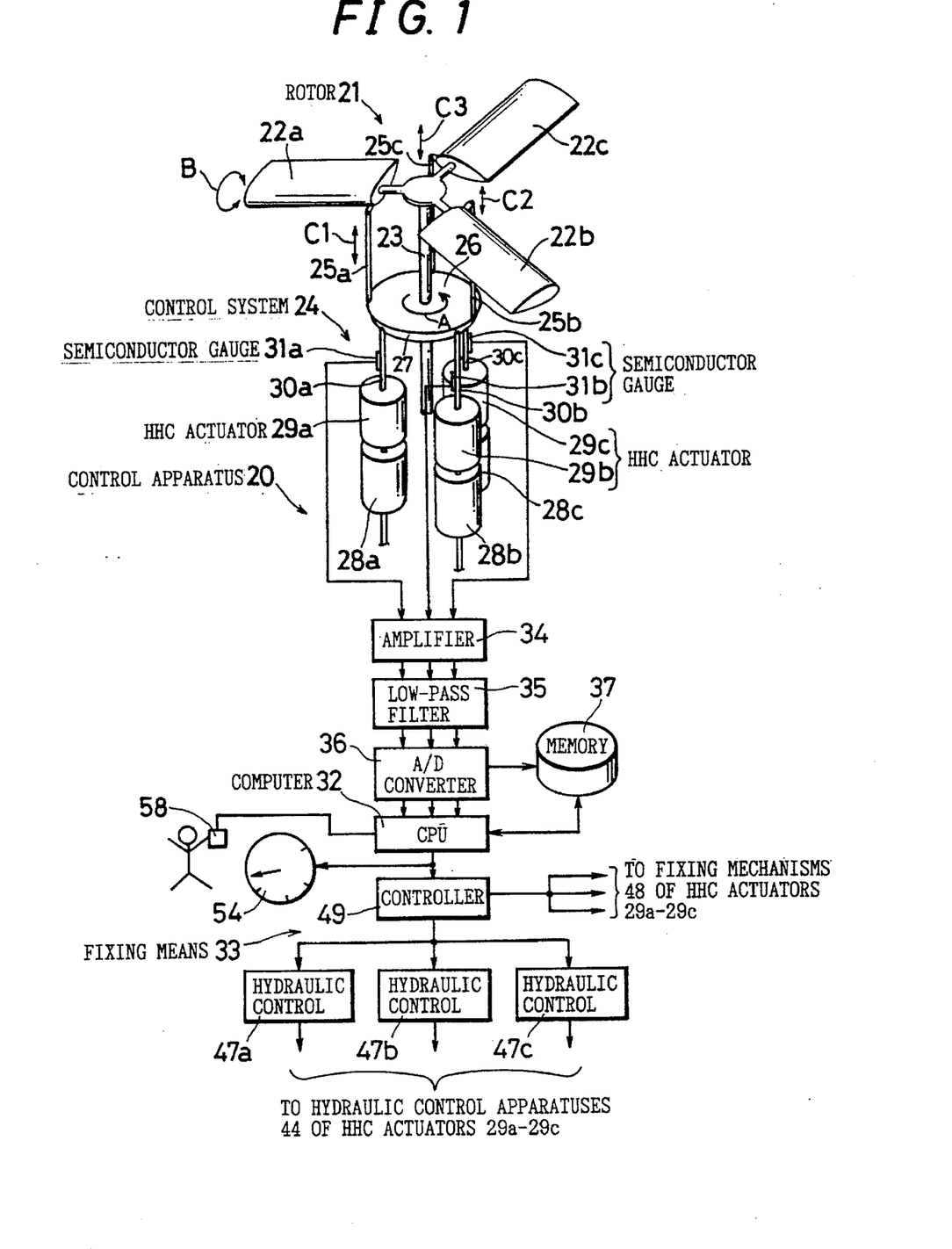
FIG. 1 is a schematic view showing a control apparatus 20 of an embodiment of the invention.

FIG. 1 is a schematic view showing a higher harmonic control apparatus (hereinafter simply referred to as a control apparatus) 20 for a helicopter rotor in an embodiment of the invention. In general, a rotor 21 provided in a helicopter has plural blades 22a, 22b, and 22c (hereinafter collectively designated by 22, if necessary). Incidentally three blades are provided in this embodiment. The blades 22a to 22c are connected to a common rotation shaft 23 in such a manner that they can be angularly displaced about an axis parallel to the longitudinal direction thereof. For example, the blade 22a can be angularly displaced as indicated by arrow B. The rotor 21 is rotated in a direction indicated b arrow A, that is, in a counterclockwise direction when viewed from above, by the torque transmitted through the rotation shaft 23 from a motor (not shown). At this time, the blades 22a to 22c are angularly displaced about said respective axes by a control system 24. As a result, angles are formed by the blades 22a to 22c with respect to a plane in which the rotor 21 is disposed, i.e., the pitch angles are controlled, and hence the lift or the direction is controlled. The helicopter is thus maneuvered.

The control system 24 comprises: pitch links 25a, 25b, and 25c respectively connected to the blades 22a through 22c; an upper swash plate 26 to which the pitch links 25a to 25c are commonly connected; a lower swash plate 27 for supporting the upper swash plate 26; three control actuators 28a, 28b, and 28c which are connected to the lower swash plate 27; and HHC actuators 29a, 29b, and 29c (hereinafter collectively designated by 29, if necessary) which are higher harmonic control actuators interposed between the lower swash plate 27 and the respective control actuators 28a to 28c. The HHC actuator 29 is an actuator having a higher harmonic control system, and hereinafter it is also abbreviated as an HHC actuator.

Each of the pitch links 25a through 25c has a rod-like shape, and one end portion thereof is connected to an end portion of the corresponding one of the blades 22a through 22c on the upstream side of the rotation direction A of the rotor 21. The upper swash plate 26 has a disk-like shape, and the other end portions of the pitch links 25a through 25c are commonly connected to the swash plate. The lower swash plate 27 has a disk-like shape, and supports the upper swash plate 26 via a bearing (not shown), in such a manner that the swash plates are angularly displaceable in relation to each other. Each of the control actuators 28a through 28c has a basal portion, and a movable portion which is movable in relation to the basal portion. Either basal portions or movable portions (in the embodiment, the basal portions) are connected to a control stick (not shown). For the embodiment shown in FIG. 1, the movable portions of the HHC actuators 29a–29c are connected to connecting rods 30a–30c, respectively.

Figure 2:
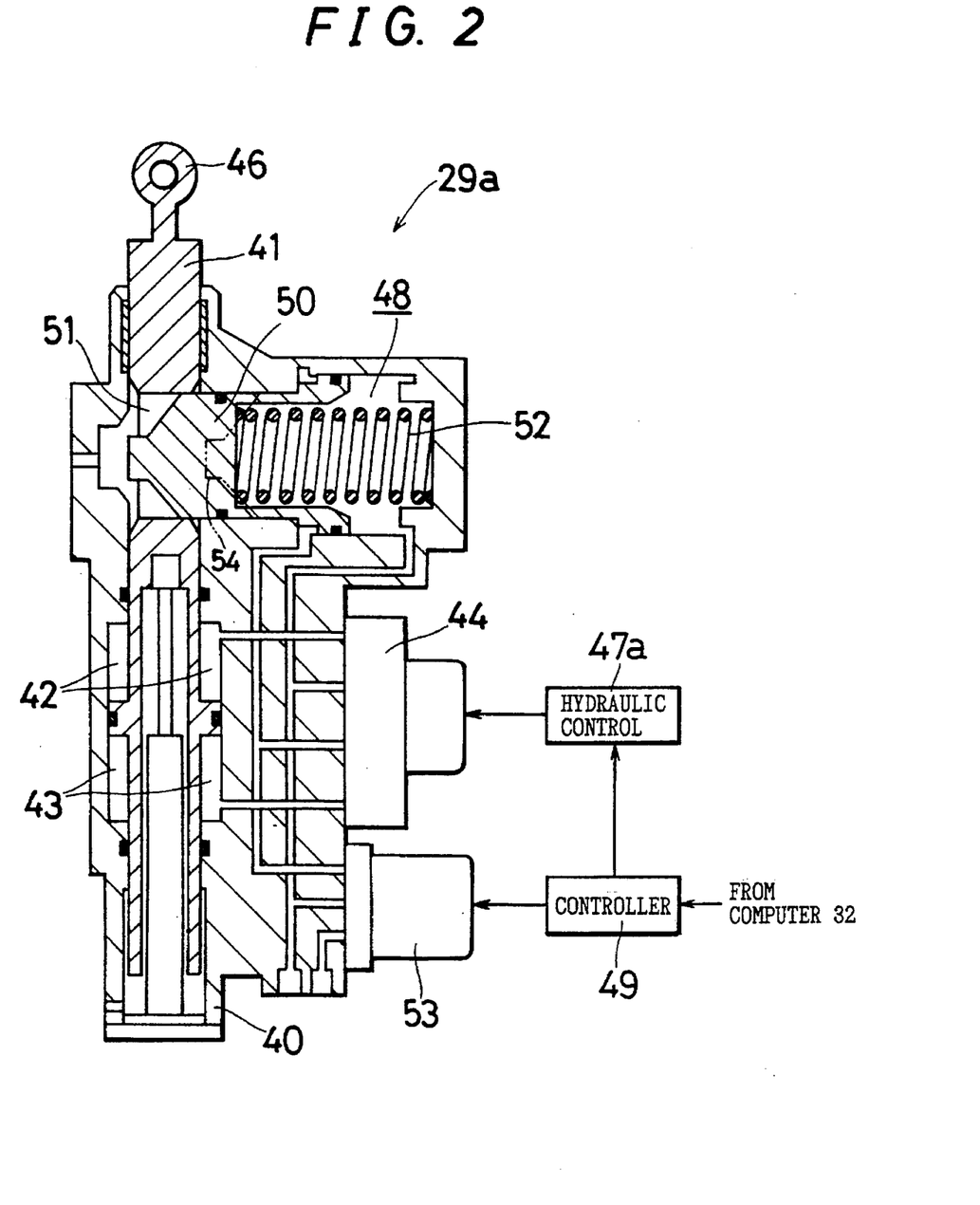
FIG. 2 is a sectional view showing an HHC actuator 29a equipped in the control apparatus 20.

FIG. 2 is a sectional view showing the HHC actuator 29a. The HHC actuator 29a has a basal portion 40 and a movable portion 41. The movable portion 41 is disposed so as to be movable with respect to the basal portion 40 in a state where one end portion of the movable portion 41 is inserted in the basal portion 40. Hydraulic pressures in spaces 42 and 43 which are formed individually by the basal portion 40 and the movable portion 41 are controlled with a hydraulic apparatus 44, so that the movable portion 41 is extended or contracted in relation to the basal portion 40. The basal portion 40 of the HHC actuator 29a is connected to a movable portion of the control actuator 28a, and the movable portion 41 of the HHC actuator 29a is connected to the lower swash plate 27 by a connecting portion 46 via a connecting rod 30a. The HHC actuators 29b and 29c have an identical composition to that of the HHC actuator 29a, and their description is omitted so as to avoid the duplication.

Referring back to FIG. 1, by using the control system 24 having the above-described composition, for example, the control actuators 28a to 28c are allowed to operate so as to extend or contract the respective movable portions with respect to the corresponding basal portions, whereby the swash plates 26 and 27 are vertically moved. As a result, the pitch links 25a to 25c are vertically moved as shown by arrows C1, C2, and C3, respectively, so that the pitch angles of the blades 22a through 22c are controlled. Accordingly, the lift is controlled and the upward or downward movement of the helicopter is controlled. Alternatively, when the pilot operates the control stick, the inclination of the swash plates 26 and 27 is controlled, so that the movement of the helicopter in the forward or backward direction, or in the rightward or leftward direction can be controlled.

Figure 3:
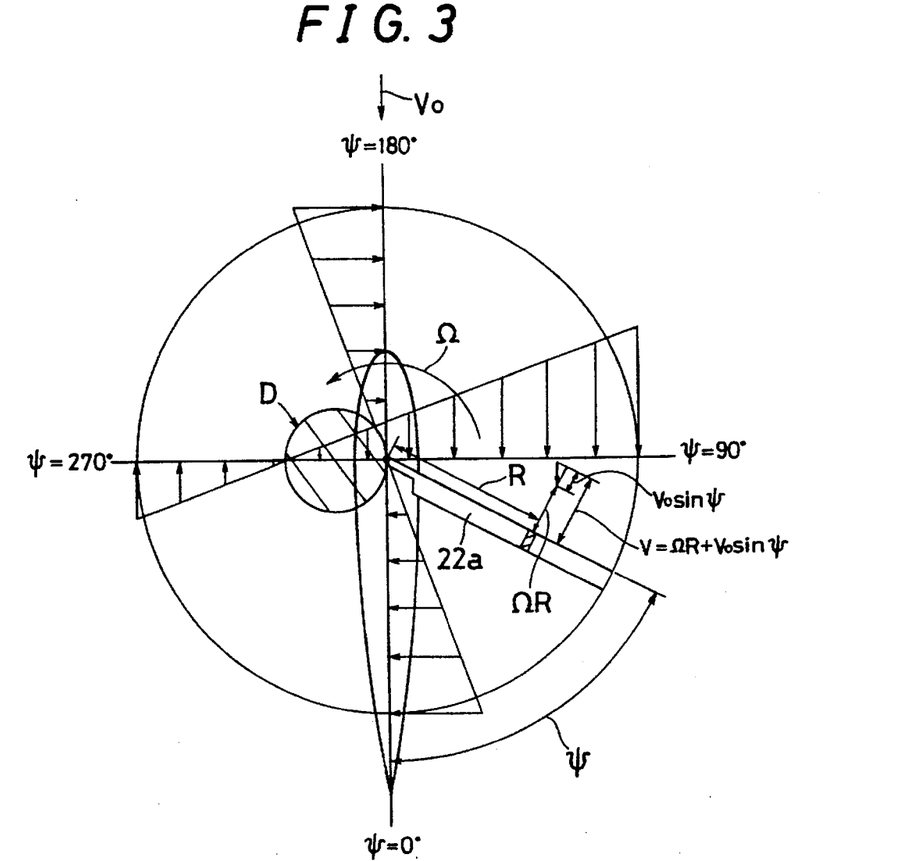
FIG. 3 is a graph showing an air velocity distribution with respect to blades 22.

When the helicopter is maneuvered, and the rotor 21 is rotated in the above-described manner, air surrounding the blade 22 exerts an external force on the blade 22. It is assumed, for example, that the helicopter advances at a velocity $V_0$ in a no-wind condition. The air velocity distribution with respect to the blades 22a to 22c in such a case is shown in FIG. 3. In order to simplify the illustration, FIG. 3 shows the distribution only for the blade 22a. The velocity distribution is obtained on the assumption that the azimuthal position when the blade 22a is positioned on the rear side of the helicopter is $\psi=0°$, and the angle $\psi$ is measured in a counterclockwise direction. FIG. 3 shows the velocity distribution when the blade 22a is positioned at an azimuthal position where $\psi=0°$, at an azimuthal position on the right side of the helicopter where $\psi=90°$, at an azimuthal position on the forward side of the helicopter where $\psi=180°$, and at an azimuthal position on the left side of the helicopter where $\psi=270°$. If the blade 22a is assumed to be rotated in a counterclockwise direction at an angular velocity $\Omega$, the air velocity V with respect to the blade 22a at a position which is separated from the rotation center of the blade 22a by a distance R is expressed by $V=\Omega \cdot R + V_0 \sin \Omega$. Accordingly, the velocity distribution shown in the figure is obtained. Section D in FIG. 3 is a reverse-flow region where the air comes from the trailing edge side to the leading edge side of the rotation direction with respect to the blade 22a. In FIG. 3, the blade 22a is exemplarily described. The other blades 22b and 22c have identical velocity distributions.

Figure 4:
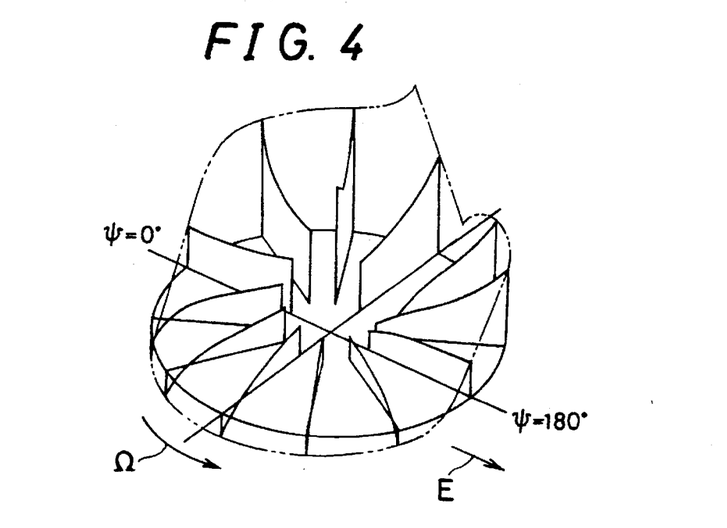
FIG. 4 is a graph showing an external force acting on the blades 22.

The air velocities with respect to the blades 22a to 22c are periodically changed during one revolution of the blades 22a to 22c, i.e., during one revolution of the rotor 21. Accordingly, as shown in FIG. 4, an external force which is produced by the air and periodically changed acts on the blades 22a through 22c. In the case where the rotor 21 is rotated in a counterclockwise direction as shown in FIG. 4, when each of the blades 22a through 22c moves in the retreating direction which is opposite to the advancing direction E of the helicopter, i.e., when each blade passes on the left side of the helicopter, the external force acting on the blade becomes larger. Thus, the external force is periodically changed during one revolution of the rotor 21, so that the external force may serve as an excitation force which vibrates the fuselage of the helicopter (not shown). In order to prevent the vibration of the fuselage, the HHC actuators 29a through 29c which actively perform the higher harmonic control are provided.

In each of the HHC actuators 29a through 29c, the movable portion 41 is extended or contracted in relation to the basal portion 40 at a frequency which is an integer multiple of the rotation frequency of the rotor 21, i.e., at a higher harmonic. In this way, the swash plates 26 and 27 are displaced at a higher harmonic of the rotation frequency of the rotor 21, so that the pitch angles of the blades 22a through 22c are changed. As a result, the external forces acting on the blades 22a through 22c are actively controlled, so that the external forces are changed at a period which is shorter than a period at which the external forces are changed in the case where the HHC actuators 29a through 29c are not provided. In this way, the external forces acting on the blades 22a through 22c can be averaged in one revolution of the rotor 21, whereby the vibration of the fuselage can be damped.

As well known, such a higher harmonic control performed with the HHC actuators 29a through 29c is effective as means for reducing noises. Of course, the harmonic control can be effectively used so as to reduce noises of the rotor 21. Accordingly, for example, if the HHC actuators 29a through 29c are controlled by utilizing a computer 32 which will be described later, and by appropriately selecting a control software, it is possible to reduce noises of the helicopter. Therefore, for example, the passenger can be on board in a comfortable environment, and the adverse effect of noises on the environment around the flight course of the helicopter can be reduced.

However, as mentioned above, the HHC actuators 29a to 29c may disadvantageously damp the vibration of the fuselage when the stall of the blades 22a through 22c occurs, as mentioned above. The control apparatus 20 of the invention is provided in order that the HHC actuators 29a through 29c do not damp the vibration when the stall of the blades 22a to 22c occurs.

The control apparatus 20 comprises: said control system 24; semiconductor gauges 31a through 31c attached to the respective connecting rods 30a through 30c so as to detect a load acting on the control system 24; a computer 32 functioning as the comparing means for comparing the load detected by the semiconductor gauges 31a through 31c with a predetermined threshold of load; and fixing means 33, responsive to the output of the computer 32, for fixing the movable portions 41 of the HHC actuators 29a through 29c to the basal portions 40, respectively, when the detected load is larger than the threshold of load.

Each of the semiconductor gauges 31a through 31c which is stuck to a surface of an object to be measured obtains the strain of the object to be measured, as an electric signal which is converted from the strain. These semiconductor gauges 31a through 31c are stuck to the connecting rods 30a to 30c, respectively, so as to measure the strains of the connecting rods 30a through 30c. As a result, the load acting on the control system 24 which is caused by the external forces on the blades 22a to 22c is detected. A load signal detected in such a way is output from each of the semiconductor gauges 31a through 31c, and supplied to an amplifier 34 where the signal is amplified.

In the control means 20, a low-pass filter 35 is provided between the semiconductor gauges 31a through 31c and the computer 32. The low-pass filter 35 has a cut-off frequency which may be the double of a product of the rotation frequency of the rotor 21 and the number of the blades (in the embodiment, three).

Some of the signals amplified in the amplifier 34 are cut-off by the low-pass filter 35. That is, a load signal oscillating at a frequency lower than the double of the product of the rotation frequency of the rotor 21 and the number of the blades (in the embodiment, three) is allowed to pass through the low-pass filter 35, and then supplied to an A/D converter 36 to be digitized therein. The digitized detected load is supplied to and stored in a memory device 37 which is implemented by a hard disk, a random access memory (RAM), or the like. As a result, if the detected loads are required, the detected loads can be read out any desired time, and used, for example, as materials for study.

The digitized detected load is also supplied to the computer 32. The computer 32 compares the detected load with a threshold of load which is preset and input or stored in the memory device 37.

Figure 5:
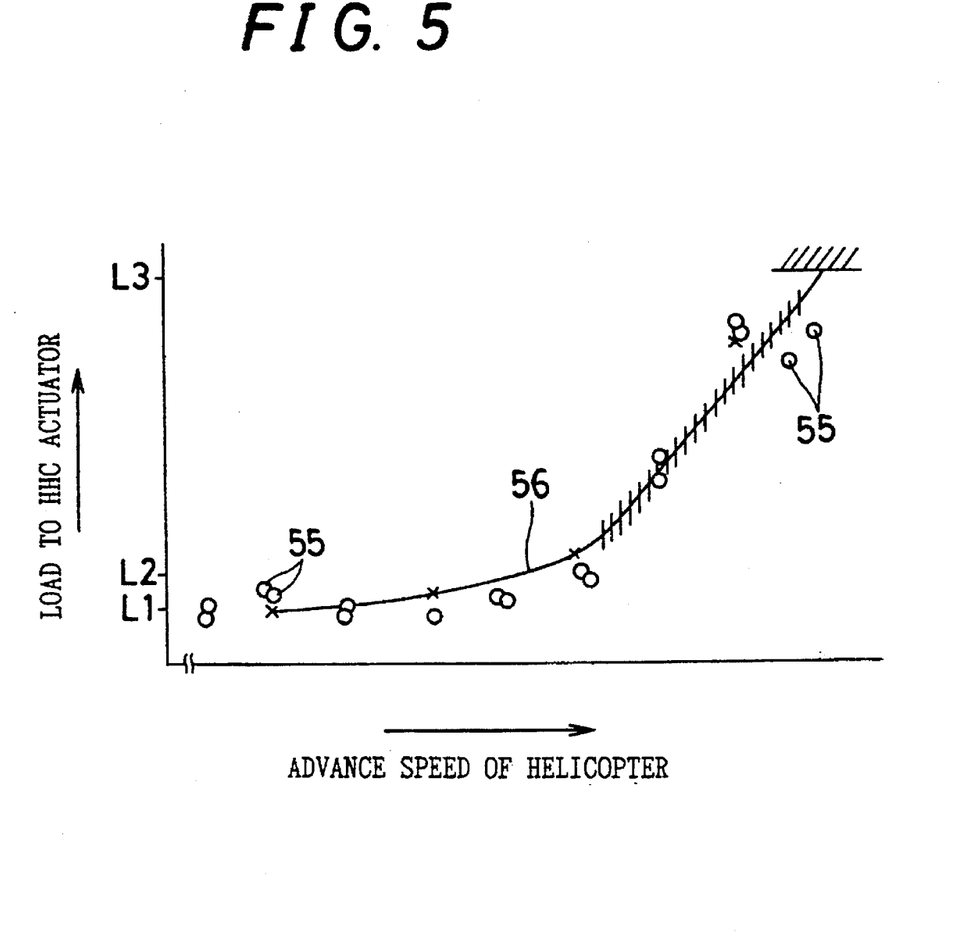
FIG. 5 is a graph showing a relationship between an advancing velocity of a helicopter and a load acting on the HHC actuator 29.

FIG. 5 is a graph showing a relationship between the load acting on the HHC actuator 29 and the advancing velocity of the helicopter. The abscissa indicates the advance speed of the helicopter, and the ordinate indicates the load acting on the HHC actuator 29. Each circle 54 in the figure indicates data obtained by an experiment. The relationship based on the experimental data is indicated by a solid line 56.

In a condition where the stall of the blade 22 does not occur, the load value on the HHC actuator 29 is not largely increased while the advance speed of the helicopter is increased. When the stall of the blade 22 occurs, the load is drastically increased. In general, the design load L3 of a control actuator is selected to be about several times to about ten times as large as a load L1 in a condition where the stall of the blade 22 does not occur. In the invention, based on such experimental results, the threshold load is set to a load L2 appearing immediately before the stall of the blade 22 occurs.

The fixing means 33 responds to the output from the computer 32, as shown in FIG. 2, and comprises: hydraulic control circuits 47a, 47b, and 47c for controlling the hydraulic apparatuses 44 disposed in the respective HHC actuators 29a through 29c for the purpose of disposing the movable portions 41 of the respective HHC actuators 29a through 29c in their neutral positions; fixing mechanisms 48 for mechanically fixing the movable portions 41 to the basal portions 40 of the HHC actuators 29a through 29c, respectively; and a controller 49 for controlling the operations of the hydraulic control circuits 47a through 47c and the fixing mechanisms 48.

The fixing mechanisms 48 are disposed in the HHC actuators 29a through 29c, respectively. Each fixing mechanism 48 comprises: a movable pin 50 for fixing the movable portion 41 to the basal portion 40; a compression coil spring 52 for urging the movable pin 50 toward the movable portion 41; and a hydraulic apparatus 53 for displacing the movable pin 50 against the urging operation of the compression coil spring 52.

In said movable portion 41, an engagement hole 51 is formed in a position which faces the movable pin 50 when the movable portion 41 is disposed in the neutral position, that is, when the movable portion 41 is not extended nor contracted in relation to the basal portion 40. Accordingly, the movable pin 50 can be inserted into the engagement hole 51, as shown in FIG. 2, when the movable portion 41 is disposed in the neutral position. The movable pin 50 can be inserted into the engagement hole 51 by the urging operation of the compressing coil spring 52. As a result, the movement of the movable portion 41 is prevented, and the movable portion 41 is fixed to the basal portion 40.

The fixing means 33 receives the comparison and operation result with the computer 32, and in response to the result, outputs to each of the hydraulic control circuits 47a through 47c a signal for controlling so as to drive the hydraulic apparatus 44 to dispose the movable portion 41 in the neutral position. After the movable portion 41 of each HHC actuator is disposed in the neutral position, the fixing means 33 outputs to the fixing mechanism 48 a signal for allowing the movable pin 50 to operate, so that the movable portion 41 is fixed to the basal portion 40.

As a result, the HHC actuators 29a through 29c function as so called connecting rods which are not extended nor contracted, so that the damping operation of the vibration caused by the external forces acting on the blades 22a to 22c is prevented. Accordingly, when the blades 22a through 22c have fallen into a stall condition, the pilot can immediately recognize the stall condition by the increased vibration of the fuselage, so that the stall condition can be recovered at an early stage, by a pilot and the safety of the flight can be secured.

It is understood that the damping operation of the vibration is prevented only when the blades 22a through 22c begin to stall, and during the proper flight, the movable pin 50 is removed from the engagement hole 51 against the urging operation of the compression coil spring 52 by the hydraulic apparatus 53. Accordingly, there is no possibility that the damping operation of vibration is disadvantageously performed, which results in the difficulty in reading of the gauges, the occurrence of fatigue of the fuselage, etc. Moreover, the flight can be performed without causing the passenger to feel a sense of unease.

In the case where the blades have stalled, the movable portion 41 is fixed to the basal portion 40 when it is in the neutral position. Then, the pitch angles of the blades 22a through 22c when the fixing means 33 operates are the same as those attained in the control system which is not provided with the HHC actuators 29a through 29c, so that the pitch angles do not adversely affect the control of the helicopter.

The control apparatus 20 is also provided with a load indicator 55 as the display means for displaying the detected load, and with a fixing switch 58 as the command means for commanding the fixing means 33 to operate, that is, to fix the movable portion 41 to the basal portion 40, regardless of the output of the computer 32. The load indicator 55 can display the detected load, for example, in real time, so that the pilot can always recognize the load acting on the control system 24 during the flight. Accordingly, the pilot can recognize the condition of the blade 22 from the displayed detected load. In addition, the pilot can operate the fixing means 33 through the fixing switch 58, so as to stop the damping operation of the HHC actuator 29. Therefore, the pilot can recognize the stall of the blade 22 at an early stage to avoid a danger.

Figure 6:
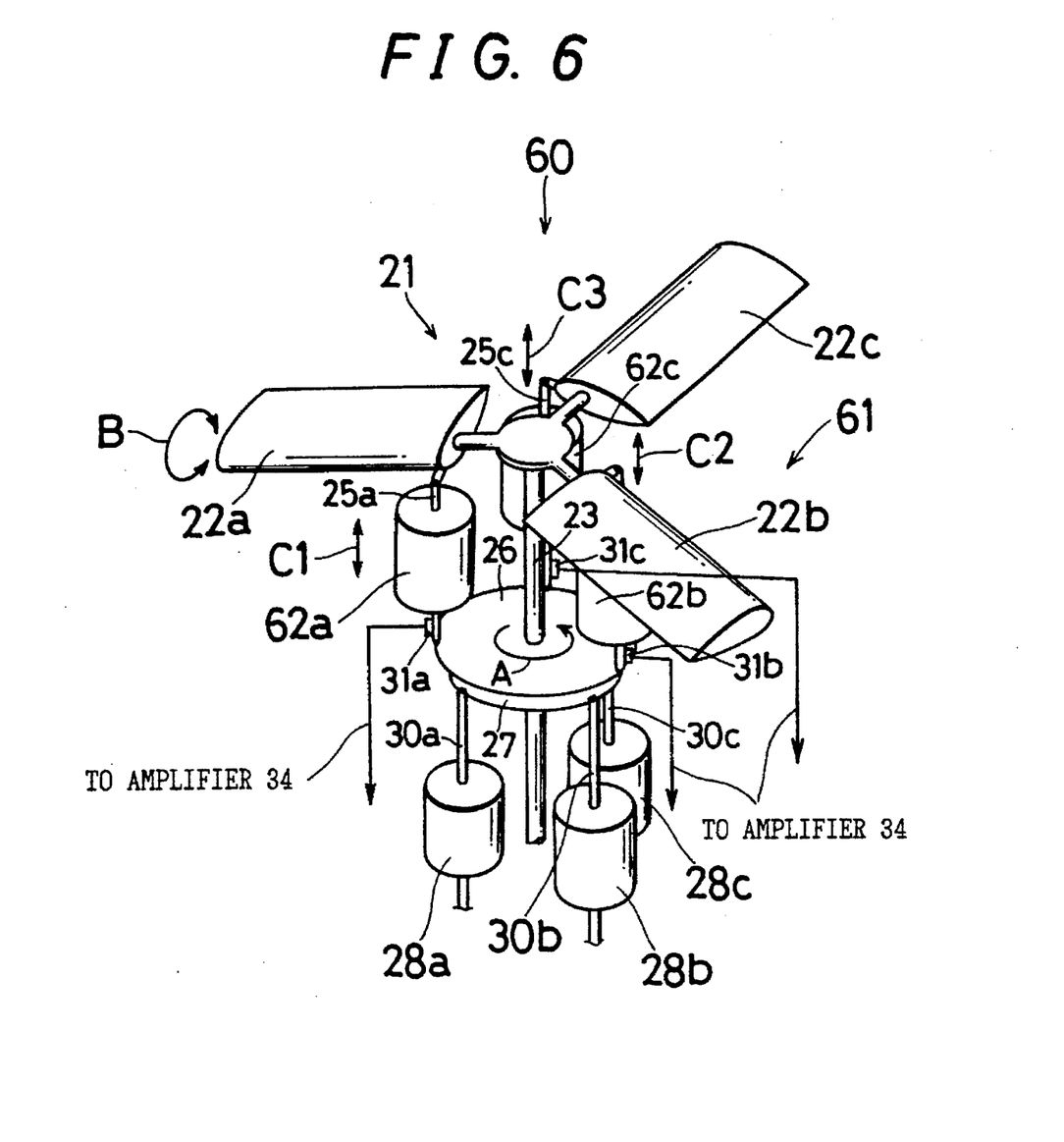
FIG. 6 is a schematic view showing a control system 61 provided in a control apparatus 60 of another embodiment of the invention.

FIG. 6 is a schematic view showing a control system 61 provided in a control apparatus 60 of another embodiment of the invention. The control system 61 of the embodiment is provided with IBC actuators 62a through 62c (hereinafter collectively designated by 62, if necessary) in place of the HHC actuators 29 provided in the control system 24 of the embodiment shown in FIGS. 1 through 5. Each of the IBC actuators 62a through 62c is an actuator having an individual blade control (IBC) system, and hereinafter it is abbreviated as an IBC actuator. The IBC actuators 62a through 62c are inserted in the middle of the pitch links 25a through 25c, respectively. Except that the pitch angles of the blades 22a through 22c are individually controlled, the IBC actuators 62a through 62c have the same composition as that of the HHC actuators 29, and hence the description thereof is omitted. In the case of the IBC actuators 62, the semiconductor gauges 31a through 31c are attached to the pitch links 25a through 25c. Components identical with those in the embodiment shown in FIGS. 1 through 5 are designated by the same reference numerals, and hence their description is omitted.

Also in the control apparatus 60 having the IBC actuators 62, the helicopter can be controlled in the same way as in the case using the control apparatus 24 having the HHC actuators 29.

In the above-described embodiments, semiconductor gauges 31 are used as the load detection means. In another embodiment of the invention, resistance wire strain gauges in which a resistance value is changed by the application of strain may be used in conjunction with piezoelectric devices which are charged by compression or expansion. In such a case, the resistance wire strain gauges detect a steady value by performing the averaging operation, and the piezoelectric devices detect an unsteady value. The steady value is added to the unsteady value, so as to obtain a total load value. The load detecting means having such a composition can attain the same effects as those attained in the above-described embodiments.

In a further embodiment of the invention, the load detection means may be constructed by a differential pressure LVDT in which a permanent magnet piece is displaced in a coil by a differential pressure in the harmonic control actuators 29 or 62, or in the control actuators 28, so as to obtain a load value from the induced electromotive force generated in the coil. Alternatively, the load detection means may be composed by a differential pressure sensor. Also such load detection means can attain the same effects as those in the above-described embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A higher harmonic control apparatus for a helicopter rotor comprising:

a higher harmonic control actuator having a basal portion and a portion movable with respect to the basal portion;

a control system for operating a pitch angle of the helicopter rotor;

means for detecting a load acting on the control system;

means for comparing the load detected by the load detecting means with a predetermined threshold of load; and fixing means, responsive to the output of the comparing means, for fixing the movable portion to the basal portion when the detected load is larger than the threshold load.

2. The higher harmonic control apparatus of claim 1, further comprising command means for activating the operation of the fixing means regardless of the output of the comparing means.

3. The higher harmonic control apparatus of claim 1, wherein an engagement hole is formed in the movable portion of the higher harmonic control actuator and the fixing means has a movable pin which can be inserted into the engagement hole when the movable portion is put in a neutral position.

4. The higher harmonic control apparatus of claim 1, further comprising display means for displaying the detected load.

5. The higher harmonic apparatus of claim 1 further comprising a low-pass filter having a predetermined cut-off frequency, the low-pass filter electrically coupled to the detecting means and the comparing means.

* * * * *